United States Patent
Shen et al.

(10) Patent No.: US 9,514,027 B2
(45) Date of Patent: Dec. 6, 2016

(54) CONTEXT-AWARE MODEL-DRIVEN HIERARCHICAL MONITORING METADATA

(75) Inventors: Andy Shen, Bellevue, WA (US); Vikram Desai, Redmond, WA (US); Vladimir Pogrebinsky, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1219 days.

(21) Appl. No.: 13/292,024

(22) Filed: Nov. 8, 2011

(65) Prior Publication Data

US 2013/0117435 A1    May 9, 2013

(51) Int. Cl.
*G06F 15/173* (2006.01)
*G06F 11/36* (2006.01)
*G06F 17/30* (2006.01)
*G06F 9/44* (2006.01)

(52) U.S. Cl.
CPC ............ *G06F 11/3616* (2013.01); *G06F 8/77* (2013.01); *G06F 17/30994* (2013.01)

(58) Field of Classification Search
CPC ................................................. G06F 11/3616
See application file for complete search history.

(56) References Cited

U.S. PATENT DOCUMENTS

| | | | |
|---|---|---|---|
| 6,484,203 B1 | 11/2002 | Porras et al. | |
| 7,444,342 B1* | 10/2008 | Hall | G06F 17/30592 |
| 7,627,671 B1 | 12/2009 | Palma et al. | |
| 7,788,280 B2 | 8/2010 | Singh et al. | |
| 7,885,206 B2 | 2/2011 | Sapsford et al. | |
| 2003/0154278 A1* | 8/2003 | Hirschman et al. | 709/224 |
| 2005/0065965 A1* | 3/2005 | Ziemann | G06F 17/30327 |
| 2005/0235274 A1 | 10/2005 | Mamou et al. | 717/136 |
| 2006/0117055 A1* | 6/2006 | Doyle | 707/102 |
| 2006/0230390 A1* | 10/2006 | Alexander et al. | 717/130 |
| 2007/0011299 A1 | 1/2007 | Farkas et al. | |
| 2008/0071800 A1* | 3/2008 | Neogi et al. | 707/100 |
| 2008/0250875 A1* | 10/2008 | Khosla et al. | 73/863 |
| 2008/0313596 A1* | 12/2008 | Kreamer | G06F 8/20 717/101 |
| 2009/0132555 A1* | 5/2009 | Singh | G06F 17/30994 |
| 2009/0187552 A1* | 7/2009 | Pinel et al. | 707/5 |
| 2009/0327353 A1* | 12/2009 | Zhuge et al. | 707/200 |
| 2010/0023919 A1* | 1/2010 | Chaar et al. | 717/101 |

(Continued)

OTHER PUBLICATIONS

Metric Forensics: A Multi-level approach for mining volatile graphs—Henderson et al. (ACM 2010).*

(Continued)

*Primary Examiner* — June Sison
(74) *Attorney, Agent, or Firm* — Henry Gabryjelski; Kate Drakos; Micky Minhas (57) ABSTRACT

Metrics are defined and collected for an application. The metrics are organized in hierarchical trees with metrics aggregated at each node in the trees. Each tree represents a different permutation of the metrics. A particular metric may occur in more than one tree. A user interface provides a default drill-down that allows users to jump from one metric to another so that only the most useful information is presented to the user. The default drill-down is defined to provide the user with a best practices method to identify and correct problems or errors in the application. Users may modify the default drill-down path.

20 Claims, 7 Drawing Sheets (56) References Cited

U.S. PATENT DOCUMENTS

2010/0161290 A1    6/2010  Duchenay et al.
2012/0204068 A1*  8/2012  Ye ...................... G06F 11/0709
                                                714/57

OTHER PUBLICATIONS

Conklin, Nathan et al., "Multiple Foci Drill-Down through Tuple and Attribute Aggregation Polyarchies in Tabular Data," IEEE Symposium on Information Visualization, 2002, pp. 131-134.
Klement, Thomas et al., "Metadata for Multidimensional Categorization and Navigation Support on Multimedia Documents," ERCIM Workshop, 1998, (7 pages).

\* cited by examiner

CONTEXT-AWARE MODEL-DRIVEN HIERARCHICAL MONITORING METADATA

BACKGROUND

Applications emit metrics that allow users to monitor the operation and health of the application. These metrics may comprise historical information regarding the function of an application, such as the type and number of operations performed or the amount of memory or processor resources consumed. The metrics may be used as a self-assessment by the application in order to keep the application up and running.

The metrics typically comprise a number of dimensions or tags. An enormous amount of data may be collected by the metrics. Many different combinations of the metric tags are possible. As a result, it may be difficult for users to sort through the metric data to identify the most relevant and useful information.

Existing user interfaces allow users to drill-down linearly through metric data. For example, users may be shown a total number of requests associated with an application. Drilling down into the requests may show the user a list of each type of request and the number of times each request occurred. Drilling further down may show the user the time each request occurred. Information about other metrics is selected separately.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide an improved user experience that guides the user through metric data in an organized manner. The metric data may be presented to the user so that useful data having more information is presented to the user in a predetermined format. Less useful data having less relevant information is not presented to the user in the predetermined format. This allows the user to be guided from one set of metric tags to another so that the most important information is available first.

Embodiments further allow users to declaratively define metrics along with metric tags. Each metric may have zero to n tags. The tags may be arranged into a "forest" (i.e. set of trees) of useful permutations, where same metric may occur in multiple trees or branches. Every node in the tree may act as an aggregation point. That is, all metrics from nodes in the tree below a current node get aggregated. The tag forests allow users to filter down the number of permutations required to be aggregated.

The configuration of the tag forests may be used at various places in the event processing pipeline. When used closer to the event source, the more the data volume is reduced. The tag forest configuration captures the data that needs to be collected based on the context. The context configuration is used to enable filtering down unnecessary data early in the event processing pipeline or to collect even less data initially if the context configuration indicates supporting data is not required in a given context. A tag forest may span multiple metrics for cross-metric drill-downs.

A composed event may be created when a predefined set of events occurs. For example, the composed event occurs when an expression over set of events along with event tags evaluates to true. The composed event may describe its own tags and how they are populated from events that contributed to creation of composed event and corresponding tag forest.

Embodiments improve time-to-solution by providing a guided user experience for drilling down into hierarchical metrics. The guided user experience leverages the tag forest configuration, which avoids confusing and distracting drill-downs into any tags.

A user interface according to one embodiment provides the ability to specify default paths for a guided experience when consuming aggregated metric data.

In one embodiment, users have the ability to build a user interface wherein the users are guided either along the default path or given a choice to navigate across a metric forest.

In other embodiments, users have the ability to configure user interfaces wherein the users are guided using a cross-metrics drill-down that leverage a cross-metric part of the tag forest.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
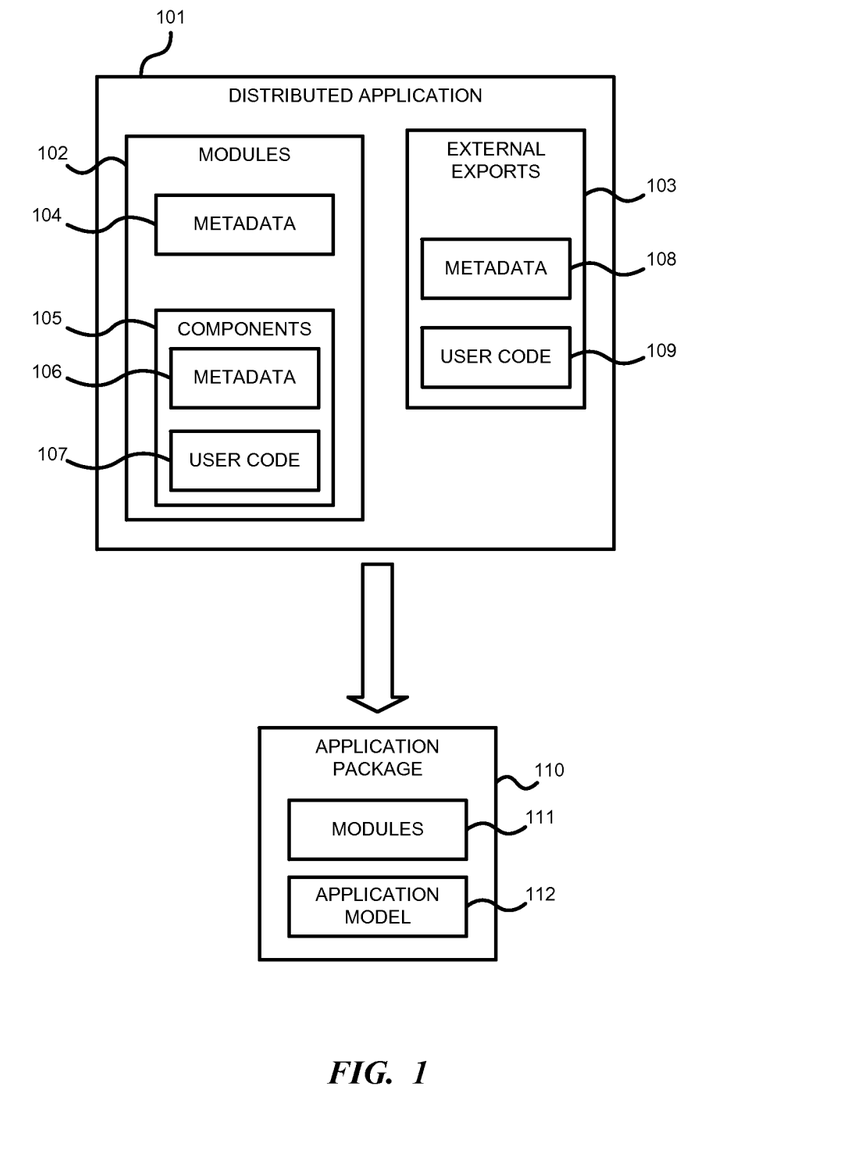
FIG. 1 is a diagram illustrating an application according to one embodiment.

FIG. 1 is a diagram illustrating an application 101 according to one embodiment. Application 101 includes modules 102 and external exports 103. Each module 102 includes metadata 104 and one or more components 105. Components 105 include metadata 106 and user code 107. External exports 103 include metadata 108 and user code 109. Metadata 104, 106, and 108 include versioning information, a description of the configuration data the code uses, resources the code may need to run, dependencies, and other information. A dependency refers to the requirement of one software entity for a second software entity to be available. A software item may have a dependency on one or more other software items.

Components 105 encapsulate user code 107, and are designed to operate together to perform a specific function or group of functions. External exports 103 allow applications to consume services that are external to the application, such as web services, through user code 107. Application 101 may be provided in the form of an application package 110, which includes modules 111 that contain all of the data (e.g., executable code, content, and configuration information) for an application, as well as an application model 112 (also referred to as an application manifest or application definition), which includes the metadata 104, 106, and 108, and defines the developer's intent for the application 101.

Application 101 and/or application package 110 may be run on any environment, such as in a Cloud environment or in on-premises equipment. The operating environment may be distributed across multiple nodes or may be contained on one node. In order to keep the application up and running, application 101 may comprise certain self-assessment capabilities that allow the application to monitor its health.

The application may measure certain metrics that relate to application health. The metrics may be stored so that historical values of the metrics may be compared and analyzed. Each metric may have information associated with it. This information may be referred to as tags for the metric. The tags may include, for example, the time the metric was collected, an identity for the user that requested the metric, an identity of a code section that created the metric event. Metric tags may be in any appropriate units, such as counts, averages, minimum values, maximum values, and measurement time frames.

Figure 2:
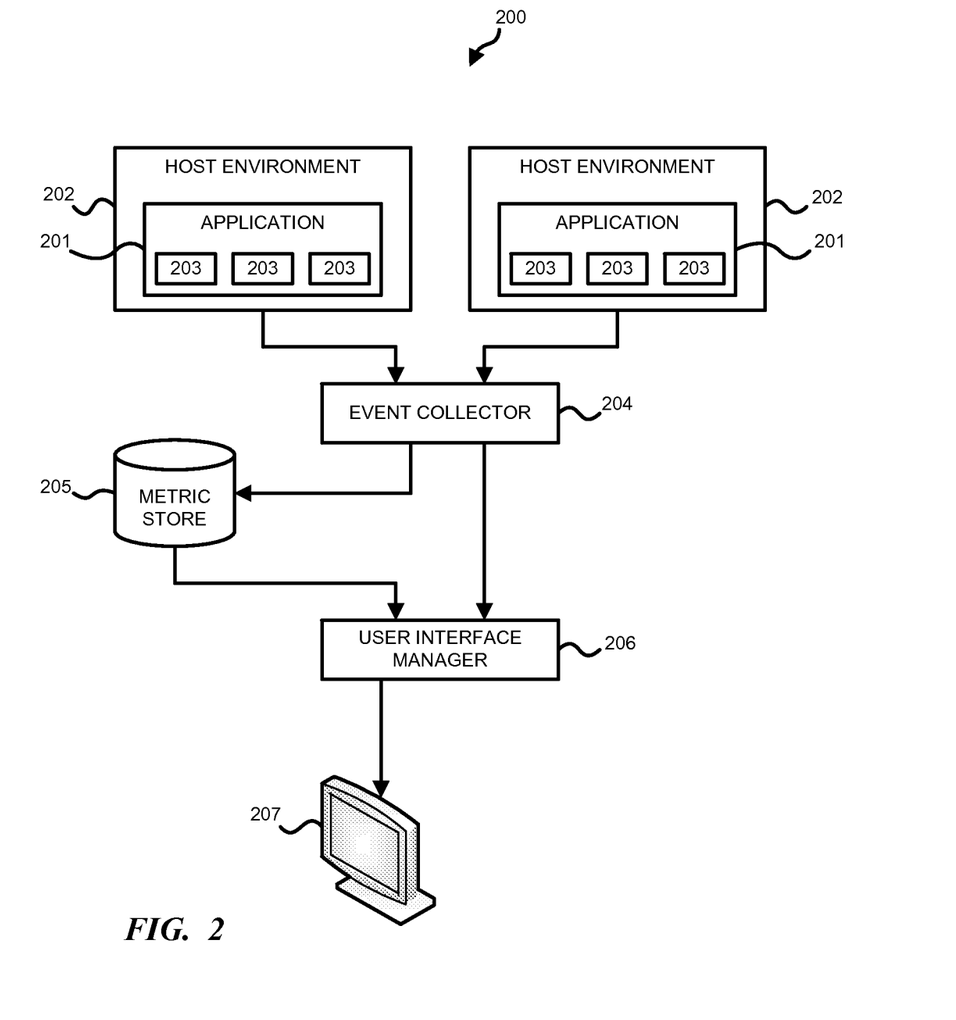
FIG. 2 is a block diagram illustrating a computer system architecture that facilitates monitoring and managing distributed applications according to one embodiment.

FIG. 2 is a block diagram illustrating a computer system architecture 200 that facilitates monitoring and managing distributed applications according to one embodiment. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Applications 201 may be run in host environments 202. Each application part 203 may be implemented in a separate host environment and connected to other application parts via correspondingly configured endpoints.

Applications 201 can provide operational information about execution. For example, during execution, applications 201 can emit information or metrics indicative of events, such as execution or performance issues, that have occurred at the distributed application. Events are data records about real-world occurrences, such as module started, stopped or its operation failed. In some embodiments, events are pushed to event collector 204. Alternatively or in combination with pushed event data, event data can be accumulated within the scope of application parts 203, etc., host environments 202, and other systems on a computer.

Event collector 204 performs aggregations of events and submits them to metric store 205 and user interface manager 206 at scheduled intervals. Event collector 204 can handle events generated from machines in different time zones, and in one embodiment, uses event timestamps in UTC. Metric store 205 may be a persistent storage systems designed to save state information and metrics. In one embodiment, only a predetermined number of data points are stored in metric store 205.

In one embodiment, event collector 204 analyzes the current or predicted health of applications 201. System 200 collects and monitors performance statistics, and predicts or forecasts performance statistics for applications 201 based on historical data. System 200, according to one embodiment, provides decentralized, scalable application management, monitoring, and troubleshooting that allows monitoring, by means of providing a real time metric acquisition and aggregation pipeline. Event collector 204 is capable of acquiring metrics on the client side (e.g., close to the consumption point of a service) as well as at the service side, by calling services' APIs to retrieve relevant metrics. These metrics may be used for troubleshooting by providing highly verbose troubleshooting data to an extensible user interface (UI) manager 206 that allows a customer-provided application-specific UI to be automatically discovered and to automatically generate a health and management model for applications 201.

Event collector 204 and metric store 205 may be configured to roll up statistics for application 201. Event collector 204 performs an aggregation of metrics based on the application model, and collects and aggregate metrics at different scopes to give a single view for an application distributed to several nodes and/or services. User interface manager 206 provides metrics to users, via display 207 for example. User interface manager 206 displays metric data so that the user can monitor and troubleshoot applications 201.

Existing systems that emit monitoring metrics do not provide sufficient information regarding consumption of the data. Additionally, current systems lack sufficient information regarding navigation across monitored metrics or across various tags of the monitored metrics. As a result, metric measurements are handled in an independent way by each user or user interface, which prevents a good default user experience for drilling down into hierarchical data. Embodiments of the metric monitoring system provide default paths for navigation across metric tags as well as across metrics themselves.

Another problem with existing systems arises from the amount of aggregation that is performed on measured metrics and the amount of memory or compute resources used by the metrics. When metrics are labeled with multiple tags, then the metrics may be aggregated based on all possible permutations and combinations of the tags. However, the number of permutations may be very large and not all of the permutations may be equally valuable. In one embodiment, information about interesting permutations is modeled and provided as part of the application configuration, which allows for a reduction in the memory and compute resources required to collect such hierarchical metrics.

In one embodiment, explicit metadata about metric tags is used to create a guided user experience and to improve time-to-solution for resolving application problems.

The collection of metric data is highly configurable to provide control over what data is collected and when data is collected. In various embodiments, both the static and dynamic collection of metric data can be configured.

In one embodiment, metrics may be declaratively defined with a number of dimensions or tags. Each metric may have zero to n tags. The tags may be associated with any relevant feature of an application or operation, such as a user identity, a requestor identity, a machine name, or a process identifier.

The tags may be arranged into trees that allow a user to drill down from one tag to the next. The tag trees may be further arranged into a "forest" (i.e. set of trees), where the forest represents a useful permutation of the tags. A particular metric may occur in multiple trees or branches. This allows the user to move from the top down or bottom up in a particular tree or to move from tree to tree in a forest of tags.

In one embodiment, every node in the tree is an aggregation point. This allows all metrics from nodes in the tree below the current node to be aggregated. At any node, the values of lower branches may be summed, averaged, or otherwise combined and presented to the user as an aggregation instead of as a number of different values.

In other embodiments, the tag forests allow the user to filter down the number of permutations required to be aggregated at a particular node. This allows selected branches to be dropped, if needed or desired, so that tags from the dropped branches are not combined with other data.

The tag forests may be configured at various places in the event processing pipeline in one embodiment. This provides control over the amount of information aggregated in any node. For example, the closer to an event source, the more the data volume can be reduced. Certain tags may have a high level of verbosity, which is very memory intensive. As a result, the collection and storage of those tags requires more resources.

In one embodiment, the metrics may be configured to adjust what data is collected based on the context (e.g. collect call stack for errors, etc.). For example, data may be collected only when there is a high data amount, but the data is not collected when the data level is below a certain level.

Context configuration in one embodiment enables filtering down of unnecessary data early in the event processing pipeline. Alternatively, even less data may be collected up-front if the context configuration indicates supporting data is not required in a given context.

The tag forest may span multiple metrics in one embodiment to allow for cross-metric drill-downs. The user interface may begin with one metric and allows for drill-down to other metrics. This allows users to jump from one forest of tags to another to better explain or illustrate the source of errors or tags.

A composed event may be created based upon the occurrence of two or more other events or tags. The composed event is created when an expression over set of events and event tags evaluates to true. The composed event describes its own tags, how to populate the tags from events that contributed to creation of the composed event, and any corresponding "tag forest." For example, if events A, B and C occur at the same time or within a defined period, then a new composed event may be created.

Embodiments improve time-to-solution when troubleshooting an application by providing a guided user experience for drilling down into hierarchical metrics. Instead of enabling all possible drill-downs, which may be confusing and distracting, a guided user interface leverages the tag forest configuration to determine optimal or most helpful drill-down information.

In one embodiment, a default path may be defined for a guided user experience when consuming the aggregated metric data. The predefined paths allow the user to use best practices when analyzing the application data. The predefined path may be configured to jump from one tag type to another when drilling down. In one embodiment, when tag x is selected by the user, the predefined path may jump to another tag y to show the source of tag x. For example, when an error is indicated in a first metric, such as a high latency, instead of drilling down within the same metric, the guided path may jump to an operation metric to show slow operations that are causing the high latency.

The user may also build a UI in which the user is either guided along the default path or given a choice to navigate across a metric forest. This advanced option allows the user to modify the default drill-down path.

The user may also build a UI in which the user is guided using a cross-metrics drilldown. This allows the user to jump from one metric to another without drilling down within one metric alone. The user may leverage the cross-metric drill-down to traverse data within the tag forest.

Figure 3:
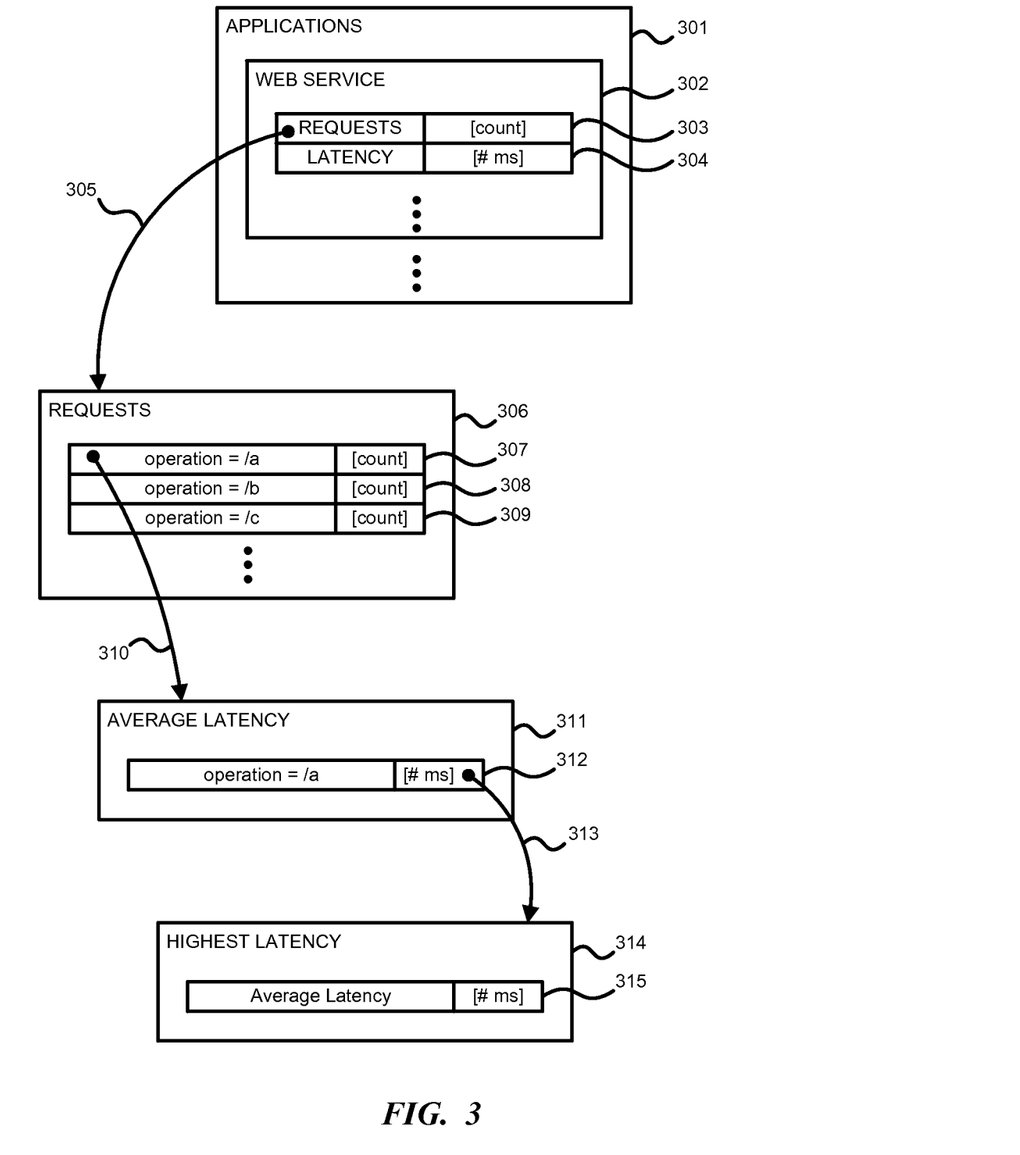
FIG. 3 illustrates a user interface drill-down path according to one embodiment.

FIG. 3 illustrates a user interface drill-down path according to one embodiment. At a top level, the user interface may show information screen 301, which lists a number of applications. Web service 302 is one of the listed services. A number of metrics, such as requests 303 and latency 304, are listed for web service 302. Requests 303 lists a count of how many requests have been processed or received within a predefined period. Latency 304 lists an average latency for web service 302 as an average number of milliseconds for each request.

A user may drill-down into requests 303 to obtain more detailed information. As indicated by selection 305, when the user high-lights, clicks, double-clicks, or otherwise selects requests 303, a new information screen 306 is displayed. Screen 306 includes detailed information associated with requests 303. As illustrated, in one embodiment, this detailed information may include a list of operations 307-309 that are being performed by the requests 303. The list of operations may be sorted based on latency so that the operations having the highest latency are shown at the top of the list. Alternatively, in other user interface configurations, the operations may be sorted alphabetically, historically, or by frequency of occurrence.

The user may drill-down to obtain additional information about a selected operation. For example, when an operation 307 is selected (310), the default drill-down path may jump to a latency metric information screen 311. The average latency for the selected operation 307 is illustrated in information screen 311. This embodiment illustrates a jump from one metric or tag to another. Instead of expanding operation 307 to show more request data, the default drill-down 310 jumps across the metric forest to the latency metric.

In one embodiment, the application developer or user determines that further expansion of selected operations in the request metric, such as showing each occurrence of a selected operation contained in the [count], is not the most helpful information. Instead, the most useful information is showing the average latency 311 of the slowest operation 307. By providing the most helpful path, the user interface guides the user to the source of an error or problem faster.

If the user selects (313) operation 312, then the guided drill-down jumps to a highest latency information screen 314 in one embodiment. Highest latency information screen 314 identifies the component or module that is creating the highest latency included the average latency for operation 312. The average latency 315 for that component or module is shown in information screen 314.

In one embodiment, the drill-down path illustrated in FIG. 3 may be a default path that is recommended by an application developer. Alternatively, the drill-down path may be a user-configured path that allows a user to view information about the application in a desired order.

Figure 4:
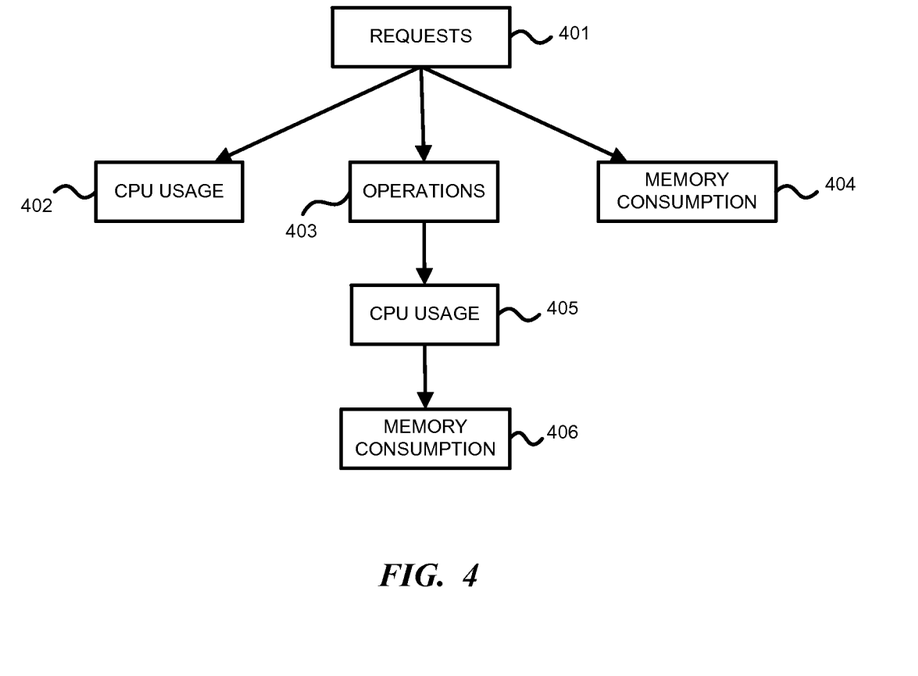
FIG. 4 illustrates a metric or tag tree according to one embodiment.

FIG. 4 illustrates a metric or tag tree according to one embodiment. While an application is running, a number of requests associated with the application are collected. Each of the requests is associated with one or more operations. Processing the requests requires a certain level of CPU or processor usage. The requests may also require a certain amount of memory for storage of parameters or other information. Each of these metrics may be collected during runtime of the application. A user may access these metrics via a user interface.

In one embodiment, the user interface initially presents the user with a list of requests 401. The requests may be displayed in any selected order, such as alphabetically, by the number of occurrences of each request type, by the order of occurrence of each request, etc. Each request is associated with additional metrics, such as CPU usage 402, operations 403, and memory consumption 404. In a traditional user interface, the user may drill-down into the tags for requests 401, such as expanding information regarding the number of requests, the type of requests, or the time the request occurred. In embodiments of a context-aware user interface, the drill-down path takes the user to another metric, such as CPU usage 402, operations 403, memory consumption 404 or any other tag instead of simply expanding information about a current metric.

A default user interface drill-down path may be used or the drill-down path may be configured by the user. When the user drills-down into requests 401, information about CPU usage 402, operations 403, or memory consumption 404 is displayed depending upon the drill-down path selected. CPU usage 402 may show the CPU usage required by one or more requests 401. The CPU usage may be sorted based upon request types or CPU usage levels, for example. Operations 403 may show the operations associated with one or more requests 401. The operations may be sorted based upon frequency of occurrence, history of occurrence, or latency, for example. Memory consumption 404 may show the memory amount consumed by each request or request type. The memory consumption data may be sorted based upon the amount of memory required by a request or by the frequency of memory access by a request, for example.

Further drill-down may be available using the selected path. For example, if requests 401 drill-down to operations 403, additional drill-down may show CPU usage 405 for operations 403. CPU usage 405 may show the CPU usage associated with one or more operations. The CPU usage may be sorted based upon CPU usage levels, for example. Drilling down from CPU usage 405 provides information about memory consumption 406. The memory consumption data may be sorted based upon the amount of memory required by an operation or by the frequency of memory access, for example.

Figure 5:
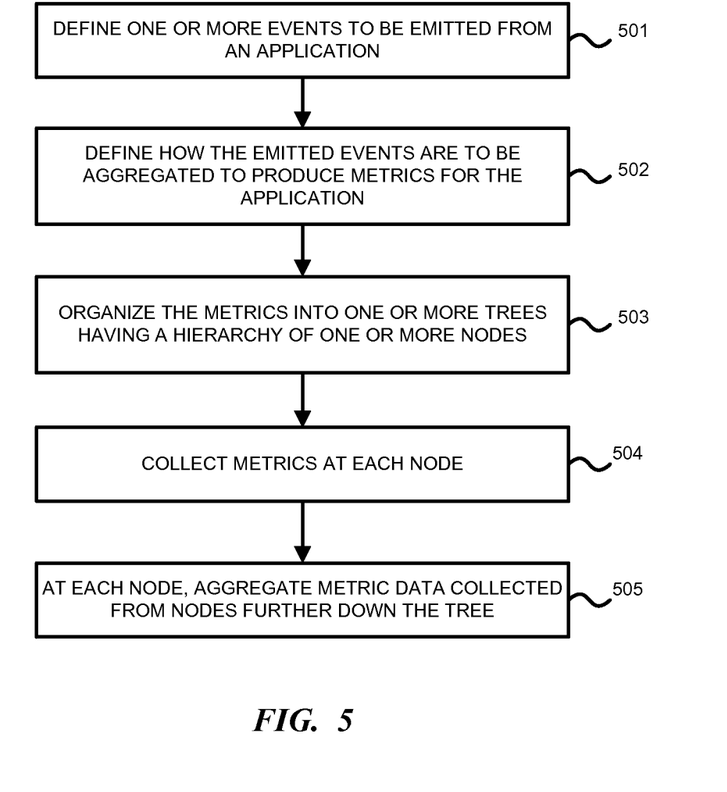
FIG. 5 is a flowchart illustrating a method or process for monitoring an application according to one embodiment.

FIG. 5 is a flowchart illustrating a method or process for monitoring an application according to one embodiment. In step 501, one or more events to be emitted from the application are defined. In step 502, aggregation of the emitted events to produce metrics for the application is defined. In step 503, the metrics are organized into one or more trees. The trees comprise permutations of different metric and have a hierarchy of one or more nodes. In step 504, metrics are collected at each node. In step 505, metric data collected from nodes further down the tree is aggregated at each node. One or more metrics may appear in a plurality of the trees.

In other embodiments, the metrics may be filtered before they are aggregated at one or more nodes. The metrics may include one or more tags. The tag data may be collected for metrics at each node.

The metrics collected at each node may be modified based upon an application context. Data collected at each node may be filtered based upon an application context.

A composed event may be composed based upon two or more events, where the composed event is defined to occur when the two or more events occur within a selected interval.

Figure 6:
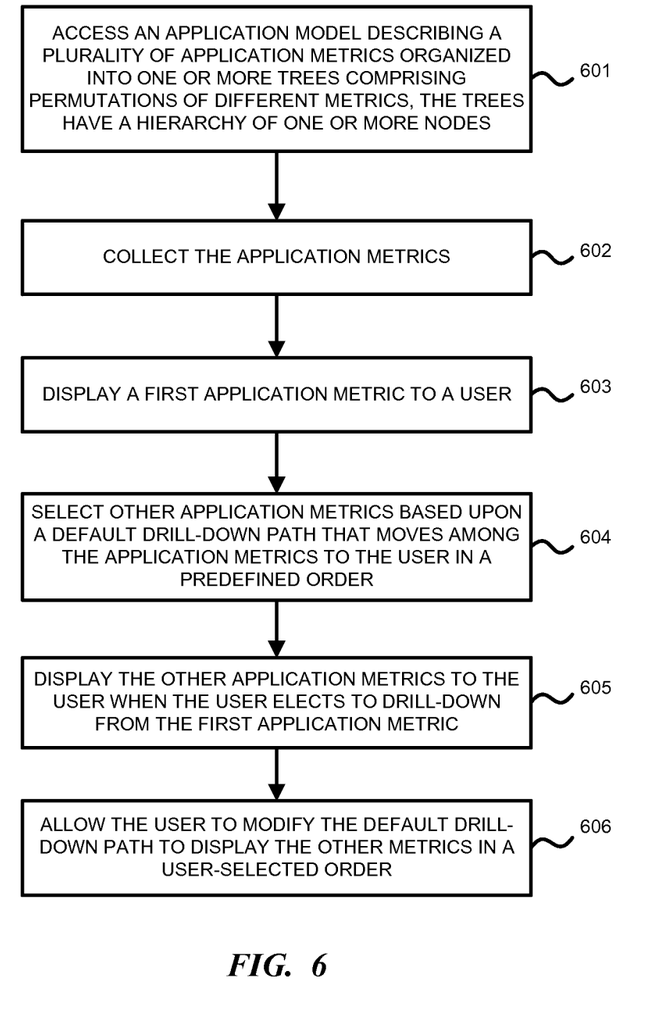
FIG. 6 is a flowchart illustrating a method or process for providing application metric data to a user according to one embodiment.

FIG. 6 is a flowchart illustrating a method or process for providing application metric data to a user according to one embodiment. In step 601, an application model describing a plurality of application metrics is accessed. The application metrics are organized into one or more trees comprising permutations of different metrics. The trees have a hierarchy of one or more nodes. In step 602, the application metrics are collected. In step 603, a first application metric is displayed to the user. In step 604, other application metrics are selected based upon a default drill-down path that moves among the application metrics to the user in a predefined order. The default drill-down path may correspond to a predefined tree of application metrics. In one embodiment, the predefined tree of application metrics may comprises a plurality of nodes, each node corresponding to a different metric. In step 605, the other application metrics are displayed to the user when the user elects to drill-down from the first application metric. In step 606, the user is allowed to modify the default drill-down path to display the other metrics in a user-selected order.

In one embodiment, the first application metric identifies an error and the default drill-down path displays other metrics that represent the source of the error. The default drill-down path may be selected based upon an application context.

A plurality of predefined trees of application metrics may be defined. The drill-down path may move between two or more of the predefined trees of application metrics.

It will be understood that steps 501-505 of the process illustrated in FIG. 5 and steps 601-606 of the process illustrated in FIG. 6 may be executed simultaneously and/or sequentially. It will be further understood that each step may be performed in any order and may be performed once or repetitiously.

Figure 7:
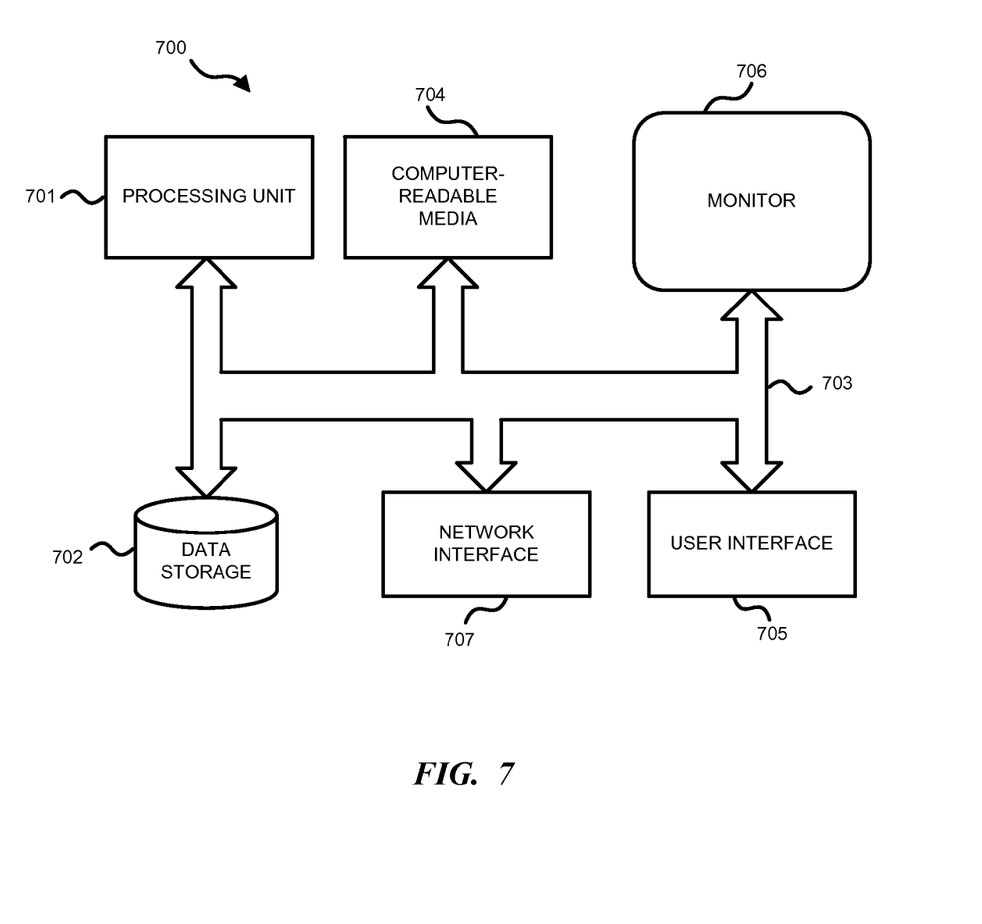
FIG. 7 illustrates one embodiment of a suitable computing and networking environment.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures.

The computer 700 typically includes a variety of computer-readable media 704. Computer-readable media 704 may be any available media that can be accessed by the computer 701 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM or RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked environment using logical connections 707 to one or more remote computers, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a LAN networking environment, the computer 700 may be connected to a LAN through a network interface or adapter 707. When used in a WAN networking environment, the computer 700 typically includes a modem or other means for establishing communications over the WAN, such as the Internet. The modem, which may be internal or external, may be connected to the system bus 703 via the network interface 707 or other appropriate mechanism. A wireless networking component such as comprising an interface and antenna may be coupled through a suitable device such as an access point or peer computer to a WAN or LAN. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring an application, comprising:
   collecting metric data representing one or more defined events emitted from the application, the collected metric data being associated with one or more metrics of the monitored application;
   organizing the collected metric data into first and second trees, the first and second trees individually comprising permutations of different subsets of the metrics of the monitored application and having a hierarchy of one or more nodes individually representing one of the metrics of the monitored application;
   for the first and second trees, at each node, aggregating the collected metric data from nodes further down the first or second tree;
   displaying the aggregated metric data of a first metric and an associated first metric tag to the user, the first metric being associated with a first node in the first tree;
   receiving a user selection of the displayed first metric tag; and
   in response to the received user selection of the first metric tag, displaying the aggregated metric data of a second metric to the user according to a predefined drill down path, the second metric being associated with a second node in the second tree.

2. The method of claim 1, further comprising:
   sorting the collected metric data associated with the metrics to be aggregated at one or more nodes of the first and second trees.

3. The method of claim 1, further comprising:
   filtering the collected metric data associated with the metrics to be aggregated at one or more nodes of the first and second trees.

4. The method of claim 1, wherein the metrics include one or more tags, and the method further comprising:
   configuring tag data to be collected for metrics at each node of the first and second trees.

5. The method of claim 1, further comprising:
   receiving modifications of the metrics collected at each node in the first or second tree based upon an application context.

6. The method of claim 1, further comprising:
   filtering the metric data collected at each node in the first or second tree based upon an application context.

7. The method of claim 1, wherein one or more of the metrics are associated with a node in both the first and second trees.

8. The method of claim 1, further comprising:
   receiving a definition of a composed event based upon two or more events, the composed event defined to occur when the two or more events occur within a time interval.

9. A method for providing application metric data associated with an application to a user, comprising:
   accessing an application model describing a plurality of application metrics, the application metrics being organized into first and second trees individually comprising permutations of different subsets of the application metrics, the first and second trees each having a hierarchy of one or more nodes individually representing one of the application metrics;
   collecting data associated with the application metrics from the application;
   displaying the collected data associated with a first application metric to the user, the first application metric being associated with a first node in the first tree;
   receiving a user selection of the displayed first application metric; and
   in response to the received user selection of the first application metric, instead of displaying the collected data associated with a node in the hierarchy of the first tree that is subsequent to the first node, displaying the collected data associated with a second application metric, the second application metric being associated with a second node in the second tree according to predetermined drill-down path.

10. The method of claim 9, wherein the first application metric includes operations performed by a web service request, and wherein the information of the node in the hierarchy of the first tree subsequent to the first node includes each occurrence of a selected one of the operations, and wherein the second application metric includes an average latency of the selected one of the plurality of operations.

11. The method of claim 9, further comprising:
    allowing modification of the predetermined drill-down path.

12. The method of claim 9, further comprising:
    receiving the drill-down path predetermined based upon an application context.

13. The method of claim 9, wherein the drill-down path corresponds to a predefined tree of the application metrics.

14. The method of claim 13, wherein the predefined tree of application metrics comprises a plurality of nodes, each node corresponding to a different one of the application metrics.

15. The method of claim 13, further comprising:
    receiving definitions of a plurality of predefined trees of the application metrics; and
    wherein the drill-down path moves between two or more of the predefined trees of the application metrics.

16. A method for monitoring an application, comprising:
    collecting data associated with one or more operational metrics of the monitored application, the collected data representing one or more predefined events associated with operations of the application;
    organizing the collected metric data into first and second trees, the first and second trees individually comprising different subsets of the operational metrics of the monitored application and having a predefined hierarchy of one or more nodes individually representing one of the operational metrics of the monitored application, wherein each node of the first and second trees contains metric data aggregated from nodes further down the first or second tree;
    outputting the aggregated metric data of a first metric, the first metric being associated with a first node in the first tree;
    receiving a user drill-down selection of the outputted metric data of the first metric; and
    in response to the received user drill-down selection of the outputted metric data of the first metric, outputting the aggregated metric data of a second metric according to a predefined drill-down path, the second metric being associated with a second node in the second tree.

17. The method of claim 16, wherein the metrics include one or more tags, and the method further comprising:
    configuring tag data to be collected for metrics at each node of the first and second trees.

18. The method of claim 16, further comprising:
    receiving modifications of the metrics collected at each node in the first or second tree based upon an application context.

19. The method of claim 16, further comprising:
filtering the metric data collected at each node in the first or second tree based upon an application context.

20. The method of claim 16, wherein one or more of the metrics are associated with a node in both the first and second trees.

\* \* \* \* \*